United States Patent [19]
Kishi

[11] Patent Number: 5,655,361
[45] Date of Patent: Aug. 12, 1997

[54] SOUND ABSORBING APPARATUS FOR A SUPERSONIC JET PROPELLING ENGINE

[75] Inventor: Kimihiro Kishi, Komaki, Japan

[73] Assignee: Mitsubishi Jukogyo Kabushiki Kaisha, Tokyo, Japan

[21] Appl. No.: 526,235

[22] Filed: Sep. 11, 1995

[30] Foreign Application Priority Data

Sep. 14, 1994 [JP] Japan .................. 6-220067

[51] Int. Cl.$^6$ ............................. F02K 1/38; F02K 1/44
[52] U.S. Cl. ..................... 60/266; 239/127.3; 181/222
[58] Field of Search .................. 60/266, 271; 239/127.3; 181/213, 220, 222

[56] References Cited

U.S. PATENT DOCUMENTS

| | | | |
|---|---|---|---|
| 4,747,543 | 5/1988 | Madden | 239/127.3 |
| 5,080,284 | 1/1992 | Cires | 60/266 |
| 5,388,765 | 2/1995 | Hill et al. | 60/266 |

*Primary Examiner*—Louis J. Casaregola
*Attorney, Agent, or Firm*—Wenderoth, Lind & Ponack

[57] ABSTRACT

To reduce a noise and to cool a nozzle in a supersonic jet propelling engine, a sound absorbing member made of a porous plate (4) and a honeycomb structure (2) or a porous plate (4) and a torus core (3) is provided between a nozzle plate (5) and a liner (1), a cooling air (7) is caused to flow along an inner surface of the nozzle plate (5) and to impinge against the liner (1) through holes (10) of the porous plate (4). Furthermore, a number of holes (11) which are slanted on a rear side are formed in the liner (1) so that the cooling air (9) are injected through the holes (11).

2 Claims, 5 Drawing Sheets

5,655,361

SOUND ABSORBING APPARATUS FOR A SUPERSONIC JET PROPELLING ENGINE

BACKGROUND OF THE INVENTION

1. Field of the Invention

The present invention relates to a sound absorbing device for a supersonic jet propelled engine.

2. Description of the Related Art

FIG. 7 shows a longitudinal sectional view showing a turbo fan engine which is a typical example of a supersonic jet propelling engine. The propelling engine is composed of, from a front side, a fan 101, a compressor 102, a burner 103, a high pressure turbine 104, a low pressure turbine 105, an after-burner 106 and an exhaust gas nozzle 107. A combustion gas 6 generated in a gas generator portion (indicated by the reference numerals 101 to 106) flows in a direction indicated by the arrow to be injected through the exhaust gas nozzle 107 into the atmosphere.

FIG. 8 is an enlarged longitudinal sectional view showing the exhaust gas nozzle 107 shown in FIG. 7. In FIG. 8, there are shown a liner 1, a nozzle plate 5, an outer plate 15 of the exhaust gas nozzle 107, the high temperature combustion gas 6 that flows at a high speed through the nozzle and cooling air 7 that flows between the liner 1 and the nozzle plate 5 for preventing elevation of the temperature of the liner 1. As is apparent from the drawings, the conventional super sonic jet propelling engine is not provided with any sound absorbing material that is usable with the high temperature combustion gas which would be kept at a temperature of about 2,000° C. Therefore, it is impossible to effect the sound absorbing function for preventing the sound or noise generation associated with the flow of exhaust gas.

In a conventional subsonic airplane jet propelling engine, a fan gas is mixed with the exhaust gas by a flow mixer to decrease the temperature of the exhaust gas, and noise is reduced by applying a sound or noise absorbing material to the mixer. However, it is impossible to adopt such a noise reduction technique since it is impossible to increase a bypass ratio from the fan in the subsonic airplane engine.

An object of the present invention is to provide a sound absorbing apparatus for a supersonic airplane engine, which may work at a high temperature.

SUMMARY OF THE INVENTION

In order to overcome the above-described and other objects, according to the present invention, there is provided a supersonic jet propelling engine having an exhaust gas nozzle composed of a nozzle plate and a liner. A first surface of a honeycomb structure or a torus core is provided with a porous plate which is in contact with a liner surface within the exhaust gas nozzle. Holes are formed in the liner for introducing, to the liner surface on a combustion gas passage side, a cooling air that flows into the honeycomb structure or torus core through porous holes of the porous plate and impinges against the liner surface.

In the supersonic jet propelling engine using the honeycomb structure, holes may be formed in the liner for introducing, on a rear side of the exhaust nozzle, a cooling air that flows into the honeycomb structure through porous holes in the porous plate and impinges against the liner surface.

In order to overcome the above-noted and other objects, according to the present invention there is provided a supersonic jet propelling engine having an exhaust gas nozzle composed of a nozzle plate and a liner, wherein a first surface of a torus core is provided on a second surface thereof with a porous plate which is in contact with a liner surface within the exhaust nozzle.

In this case, no punching is effected on the liner.

In order to overcome the above-noted and other objects, according to the present invention, there is further provided a supersonic jet propelling engine having an exhaust gas nozzle composed of a nozzle plate and a liner. A honeycomb structure or a torus core is provided on two-sided surfaces thereof with porous plates which are disposed within the exhaust nozzle. Holes are formed in the liner for introducing, on the liner surface on a combustion gas passage side, a cooling air that flows into the honeycomb structure or the torus core from holes in one in the porous plates, ejects from holes of the other porous plate and impinges against the liner surface.

The sound absorbing apparatus for a supersonic jet propelling engine of the present invention has the above-described structure. In this sound absorbing apparatus, the sound absorbing member, made of the porous plate and the honeycomb structure or the torus core, is provided between the nozzle plate and the liner. The cooling air is caused to flow along the inside of the nozzle plate and the absorbing member and to impinge against the liner through the holes in the porous plate for the impingement cooling or the liner surface is cooled by a film cooling while flowing from the holes formed in the liner whereby the porous plate, honeycomb structure, torus core and/or liner function as a sound absorbing material.

DESCRIPTION OF THE PREFERRED EMBODIMENT

The present invention will now be described with reference to the accompanying drawings.

Figure 1A:
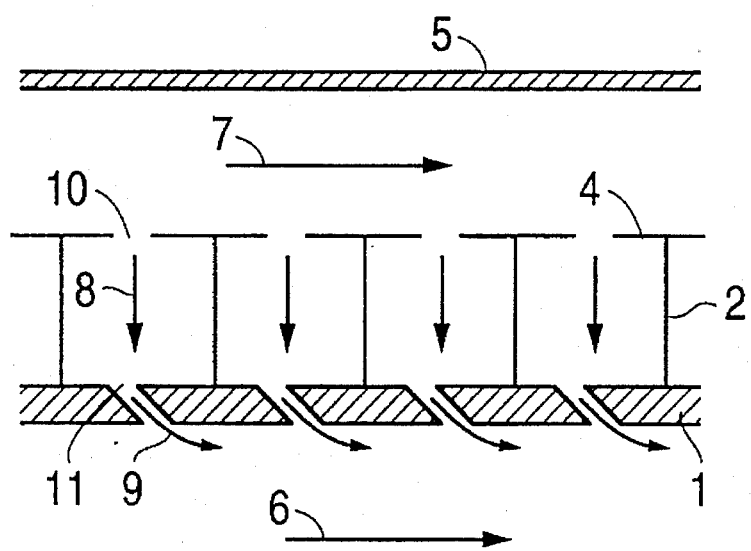
FIG. 1(a) is a longitudinal sectional view and FIG. 1(b) is a perspective view showing a sound absorbing apparatus according to a first embodiment of the present invention.
Figure 1B:
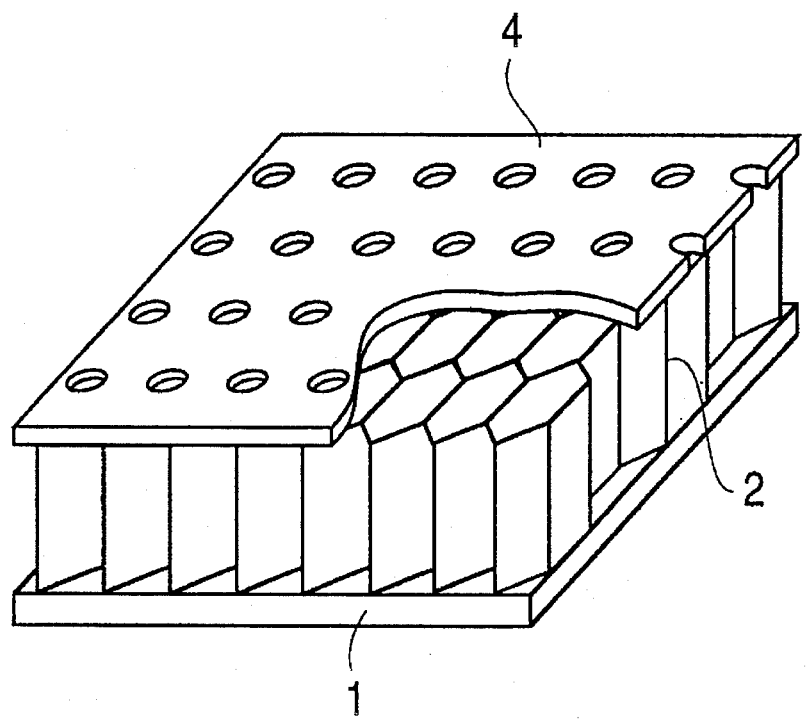

FIGS. 1(a) and 1(b) are views showing a sound absorbing apparatus in accordance with a first embodiment of the present invention. FIG. 1(a) is a longitudinal sectional view thereof and FIG. 1(b) is a perspective view thereof. In these drawings, numeral 5 denotes a nozzle plate, numeral 1 denotes a line, numeral 4 denotes a porous plate, numeral 2 denotes a honeycomb structure formed between the line 1 and the porous plate 4, numeral 10 denates holes in the porous plate 4, numeral 11 denotes slant holes formed in the liner 1, numeral 6 denotes a combustion gas, numeral 7 denotes a cooling air, numeral 8 denotes air that flows through the holes 10 of the porous plate 4 into the honeycomb structure 2 and impinges, against the liner 1, and numeral 9 denotes film film air that flow from the holes of the honeycomb structure 2 through the holes 11 formed in the liner 1 and serve as a film of air on a surface of the liner 1 exposed to the combustion gas.

The sound absorbing apparatus according to this embodiment is composed of the liner 1, the honeycomb structure 2 and the porous plate 4. The sound absorbing apparatus is used in combination with the nozzle plate 5 for absorbing the jet noise produced by the combustion gas 6 to reduce the noise level.

The cooling of the sound absorbing apparatus is carried out as follows. The cooling air 7 is caused to flow between the nozzle plate 5 and the porous plate 4 to cool the nozzle plate 5, and at the same time, air 8 enters holes 10 and is caused to impinge against the liner 1 10 of the porous plate 4. In addition, air 9 is blown through holes 11, formed in the liner 1, toward the combustion gas 6 to thereby cool the liner 1.

Figure 2A:
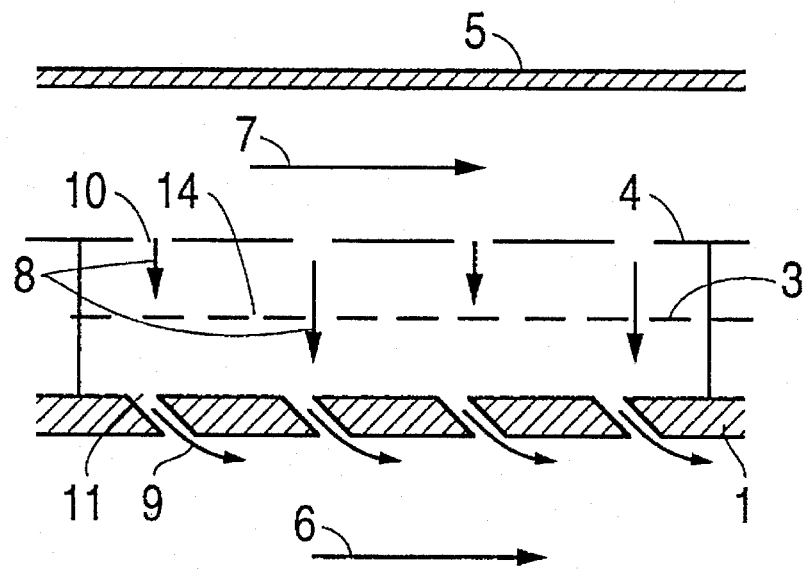
FIG. 2(a) is a longitudinal sectional view showing a sound absorbing apparatus and FIG. 2(b) is a perspective view showing a sound absorbing apparatus according to a second embodiment of the present invention.
Figure 2B:
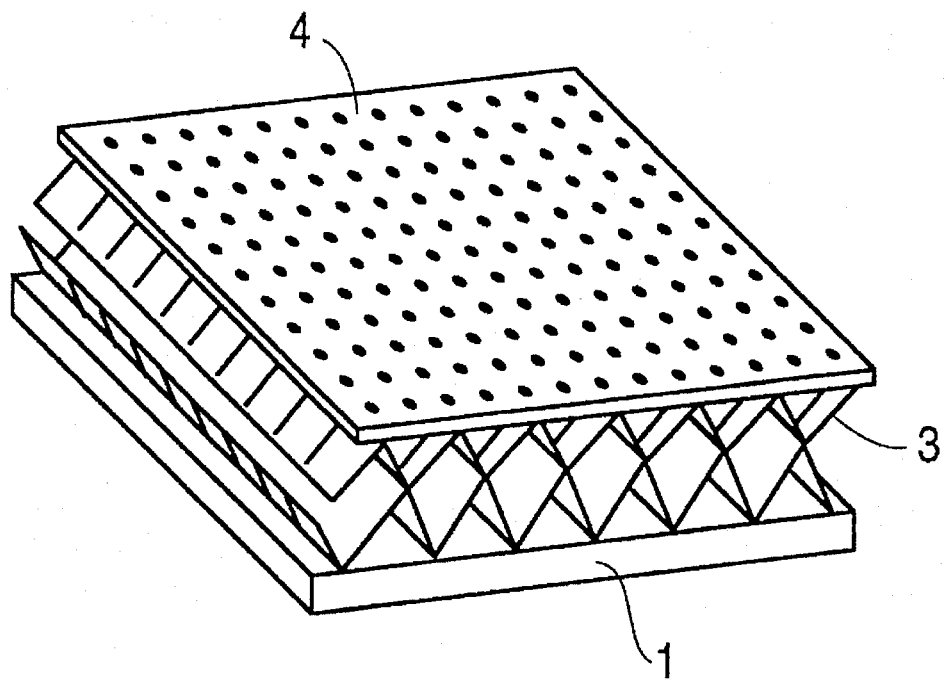

FIGS. 2(a) and 2(b) are views showing a sound absorbing apparatus in accordance with a second embodiment of the invention. FIG. 2(a) is a longitudinal sectional view thereof and FIG. 2(b) is a perspective view thereof. In this embodiment, a torus core 3 is used instead of the honeycomb structure 2 of the first embodiment. Numeral 14 denotes holes of the torus core 3. The other structure is the same as that of the first embodiment. The sound absorbing effect and the cooling effect are similar to those obtained by the first embodiment. Since the torus structure is used in the second embodiment, the second embodiment is superior to the first embodiment in deformation followability against the thermal expansion.

Figure 3:
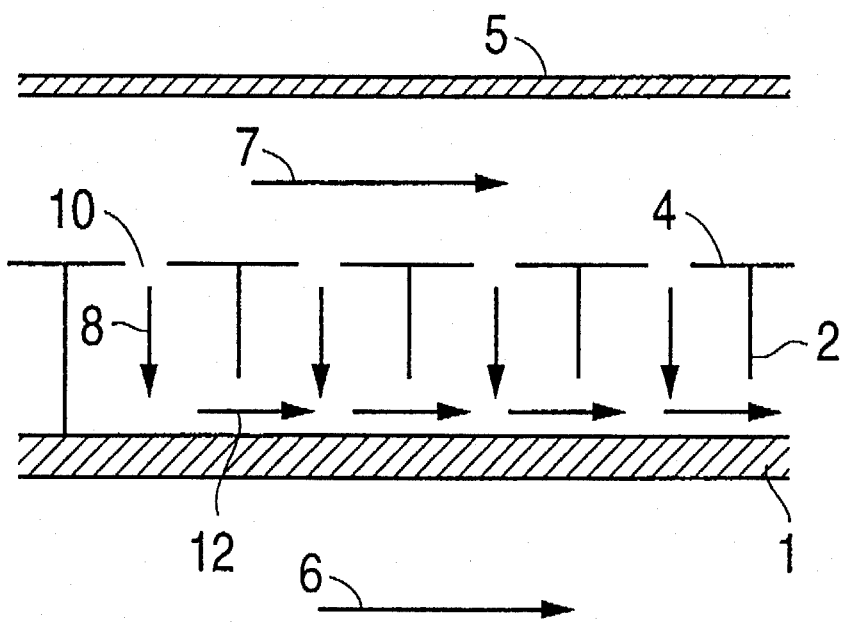
FIG. 3 is a longitudinal sectional view showing a sound absorbing apparatus according to a third embodiment of the present invention.

FIG. 3 is a longitudinal sectional view showing a sound absorbing apparatus in accordance with a third embodiment of the present invention. The holes 11 formed in the liner 1 in the first embodiment are dispensed with in this embodiment. Numeral 12 denotes an air flow passage that communicates with the interior of the honeycomb structure 2. In this embodiment, there is no film air cooling effect on the side of the liner 1 exposed to the combustion gas 6. In this embodiment, the cooling air is caused to flow toward the rear along the surface of the liner 1 on the honeycomb structure side through the air flow passage 12 provided in the honeycomb structure 2. Only one surface of the liner 1 is cooled by the forcible convection and the air 8 which impinges on the liner 1. In this embodiment, since it is unnecessary to perform the machining step necessary to form the holes 11 in the liner 1, the cost therefor may be saved. Incidentally, since the air flow passage 12 is provided in the honeycomb structure 2, the sound absorbing effect is somewhat lower than that of the first embodiment.

Figure 4:
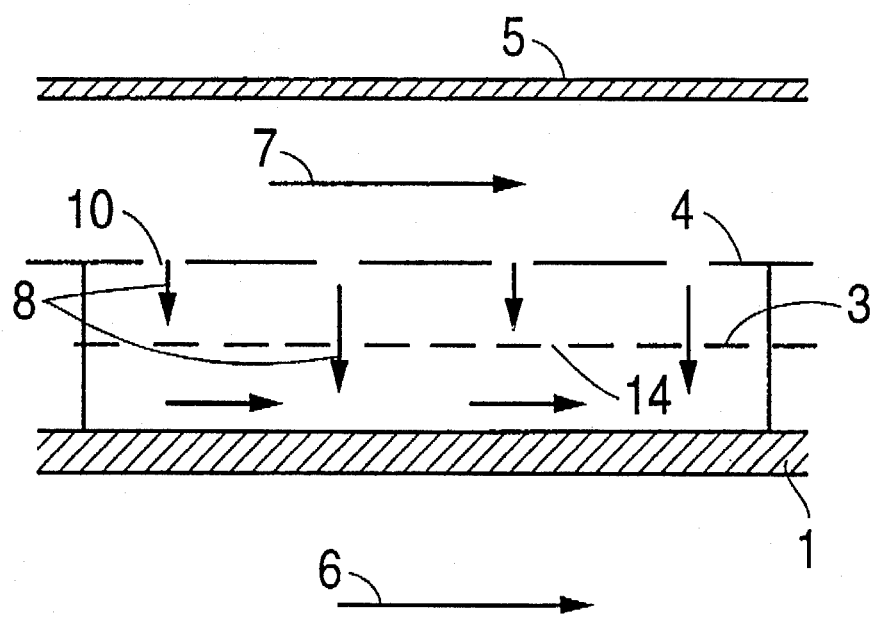
FIG. 4 is a longitudinal sectional view showing a sound absorbing apparatus according to a fourth embodiment of the present invention.

FIG. 4 is a longitudinal sectional view showing a sound absorbing apparatus in accordance with a fourth embodiment of the present invention. In this embodiment, the holes 11 formed in the liner 1 in the second embodiment are omitted. Also, in this embodiment, the cooling air is caused to flow along one side of the liner 1 in the same way as in the third embodiment. Thus, the liner 1 is to be cooled by this forcible convection and the air 8 which impinges on the liner. According, the machining costs associated with. The machining cost required forming the holes in the liner 1 may be saved. The sound absorbing effect is substantially the same as that of the second embodiment.

Figure 5:
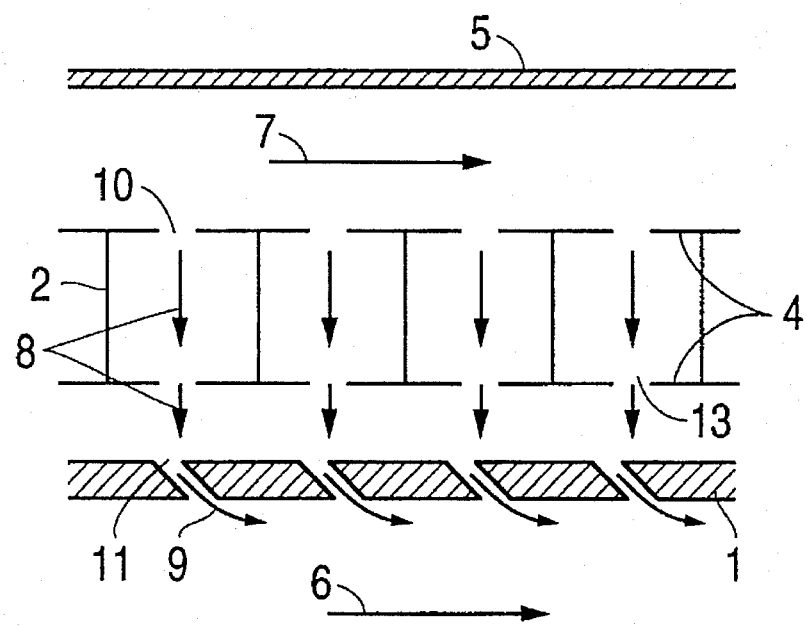
FIG. 5 is a longitudinal sectional view showing a sound absorbing apparatus according to a fifth embodiment of the present invention.

FIG. 5 is a longitudinal sectional view showing a sound absorbing apparatus in accordance with a fifth embodiment of the invention. In this embodiment, a second porous plate 4 is additionally provided in between the liner 1 and the honeycomb structure 2 so that the air 8 is caused to impinge against the liner 1 from holes 13 which are formed in the second porous plate 4 and at the same time the air is blown toward the combustion gas 6 from the holes 11 of liner 1 to thereby cool the liner 1 with a film of air 9.

In this embodiment, the honeycomb structure is independent so that a height of the honeycomb structure may be set as desired. It is also possible to maintain a high cooling effect while further enhancing the sound absorbing effect. Since the honeycomb structure 2 and the liner 1 are separated from each other, the deformation followability to the thermal expansion is more excellent than that of the first embodiment. The cooling effect of this embodiment is the same as that of the first embodiment.

Figure 6:
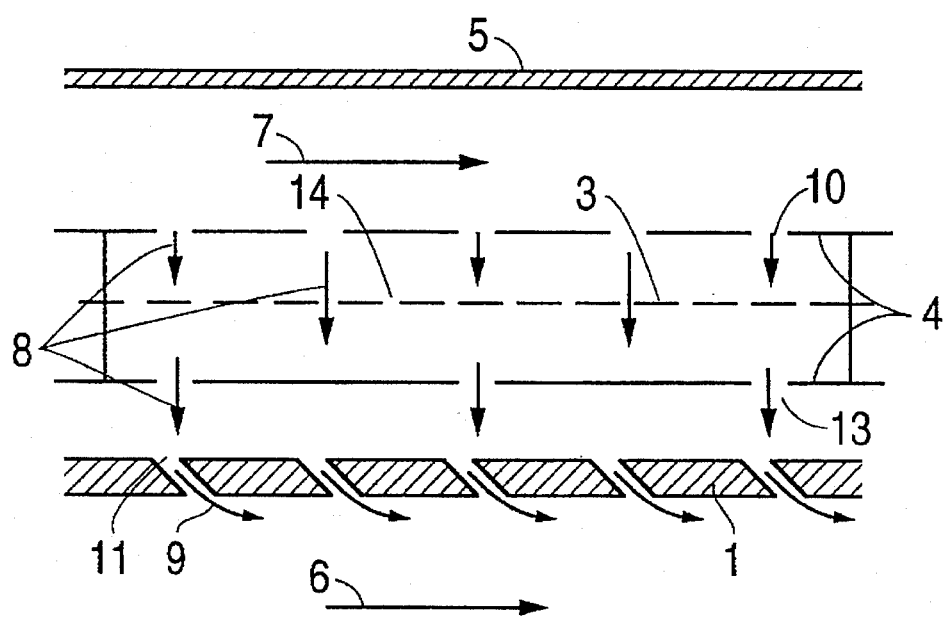
FIG. 6 is a longitudinal sectional view showing a sound absorbing apparatus according to a sixth embodiment of the present invention.
Figure 7:
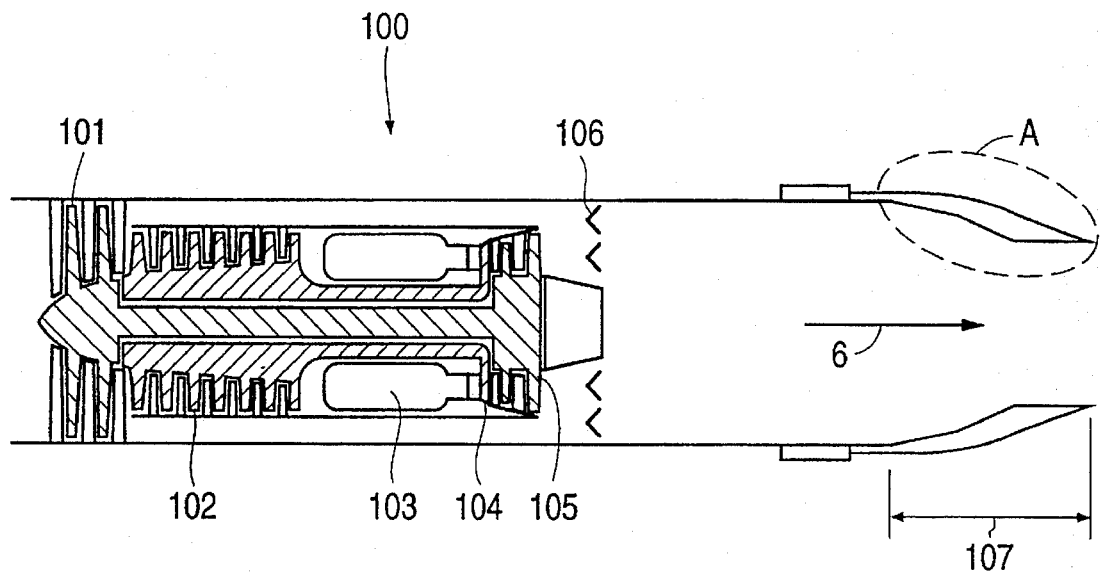
FIG. 7 is a longitudinal sectional view showing a typical supersonic jet propelling engine.
Figure 8:
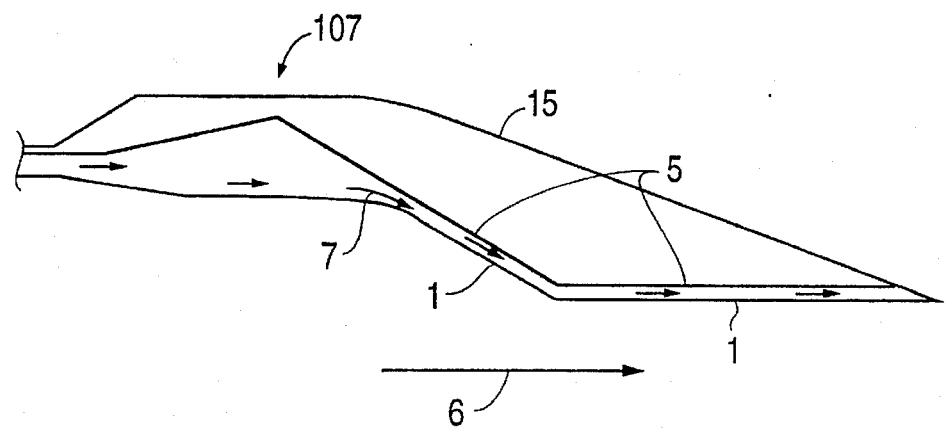
FIG. 8 is an enlarged longitudinal sectional view showing an exhaust gas nozzle shown in FIG. 7.

FIG. 6 is a longitudinal sectional view showing a sound absorbing apparatus in accordance with a sixth embodiment of the invention. In this embodiment, a second porous plate 4 is provided in between the liner 1 and the torus core 3 so that the torus core 3 is independent of the liner 1. The air 8 is caused to impinge against the liner 1 through the holes 13 from the torus core 3, and the film of air 9 is blown out through the holes 11 of the liner 1. The advantage and effect of this embodiment is substantially the same as those of the fifth embodiment.

As described above, in the sound absorbing apparatus for the jet propelled engine according to the present invention, the sound absorbing member composed of the porous plate and the honeycomb structure or the porous plate and the torus core is provided between the nozzle plate and the liner. Cooling air is caused to flow along the inside surface of the nozzle plate. The cooling air is caused to impinge against the liner through the holes of the porous plate, and further preferably, a number of rearwardly directed slant holes may be formed in the liner, so that the cooling air that has impinged against the liner flows through the holes for cooling. Accordingly, it is possible to use the apparatus at a high temperature as well as to reduce the noise generated by the jet. Also, the sound absorbing material is cooled by utilizing the cooling air that has been fed to the exhaust nozzle, thereby simplifying the structure of the sound absorbing apparatus and reducing the weight thereof.

Various details may be changed without departing from the spirit and scope of the present invention. Furthermore, the foregoing description of the embodiments according to the present invention is provided for the purpose of illustration only, and not for the purpose of limiting the invention as defined by the appended claims and their equivalents.

What is claimed is:

1. A cooling and noise reducing wall assembly for an exhaust gas nozzle of a supersonic jet engine, said wall assembly comprising:

a nozzle plate;

a liner spaced from said nozzle plate, said liner having a first surface, a second surface exposed to hot combustion gases, and a plurality of holes extending between said first surface and said second surface;

a honeycomb structure spaced from said nozzle plate and having a first side opposing said nozzle plate and a second side positioned directly on said first surface of said liner; and a porous plate attached to said first side of said honeycomb structure, wherein said porous plate and said nozzle plate define a cooling air flow passage such that cooling air can flow from said cooling air flow passage through said porous plate into said honeycomb structure and impinge against said first liner surface.

2. The cooling and noise reducing wall assembly as claimed in claim 1, wherein said plurality of holes in said liner are angled in the direction of flow of the hot combustion gas so that a film of cooling air forms along said second surface of said liner.

* * * * *